United States Patent [19]

Hori et al.

[11] 4,361,123
[45] Nov. 30, 1982

[54] INTERNAL COMBUSTION ENGINE

[75] Inventors: Kenji Hori; Yuhiko Kiyota, both of Nagaokakyo; Katsuo Akishino, Kyoto, all of Japan

[73] Assignee: Mitsubishi Jidosha Kogyo Kabushiki Kaisha, Japan

[21] Appl. No.: 250,547

[22] Filed: Apr. 3, 1981

[51] Int. Cl.³ .................... F02B 75/02; F02M 23/04; F02M 25/06; F02B 33/00
[52] U.S. Cl. ................................. 123/308; 123/432; 123/440; 123/585; 123/589
[58] Field of Search ............ 123/440, 437, 585, 589, 123/308, 432; 60/276, 285

[56] References Cited

U.S. PATENT DOCUMENTS

| | | | |
|---|---|---|---|
| 3,742,923 | 7/1973 | Oblander et al. | 123/585 |
| 4,023,537 | 5/1977 | Masaki | 123/589 |
| 4,132,199 | 1/1979 | Kuroiwa et al. | 123/589 |
| 4,133,322 | 1/1979 | Nakamura et al. | 123/308 |
| 4,167,161 | 9/1979 | Nakagami | 123/308 |

*Primary Examiner*—Raymond A. Nelli
*Attorney, Agent, or Firm*—Oldham, Oldham, Hudak & Weber, Co.

[57] ABSTRACT

An internal combustion engine comprising a main intake passage supplying air-fuel mixture to a combustion chamber, an auxiliary intake passage supplying air or an air-fuel mixture to the combustion chamber through an injection port, a fuel supplement passage for supplementally supplying fuel to the auxiliary intake passage, a solenoid valve provided in the fuel supplement passage, and a control device for controlling opening and closing of the solenoid valve in response to a signal from an oxygen sensor disposed in an exhaust passage, said solenoid valve controlling supply of fuel to the auxiliary intake passage, thereby regulating an overall air-fuel ratio of the mixture supplied to the combustion chamber approximately to a stoichiometric air-fuel ratio.

6 Claims, 5 Drawing Figures

INTERNAL COMBUSTION ENGINE

BACKGROUND OF THE INVENTION

This invention relates to an internal combustion engine equipped with an exhaust gas purifying system.

In general, in the exhaust gas purifying system in which a catalytic converter is provided in an exhaust system to diminish noxious components in exhaust gas, it is desirable to set and maintain an air-fuel ratio of a mixture supplied to a combustion chamber of the engine close to a stoichiometric air-fuel ratio so as to improve an efficiency of purification of the exhaust gas within said catalytic converter. It is preferable to maintain the air-fuel ratio of the mixture at about the stoichiometric air-fuel ratio ±0.1 in order to have the noxious components such as NOx, HC, CO reduced or oxidized simultaneously by for example a ternary catalytic converter.

As a mixture supplying device for setting and maintaining the air-fuel ratio of the mixture at about the stoichiometric air-fuel ratio, it has been proposed and utilized an electronic-controlled fuel injection system which injects into an intake passage an amount of fuel controlled in proportion to said set air-fuel ratio with respect to an amount of the inducted air by means of an electronic control circuit. However, such system is very expensive and maintenance thereof is difficult.

SUMMARY OF THE INVENTION

A main object of this invention is to provide an internal combustion engine in which an auxiliary intake passage for injecting air or an air-fuel mixture into a combustion chamber to impart a swirl or turbulence to an inducted mixture to improve its combustion is additionally provided with a fuel supplement passage, and an amount of fuel supplied to the combustion chamber through the auxiliary passage is controlled to maintain an overall air-fuel ratio of the mixture in the combustion chamber close to a stoichiometric air-fuel ratio.

Another object of this invention is to provide an internal combustion engine in which an air-fuel ratio of the mixture in idling and low and high-load driving ranges of the engine is maintained close to a stoichiometric air-fuel ratio by control of a single solenoid valve.

A further object of this invention is to provide an internal combustion engine in which an efficiency of purification of exhaust gas within a ternary catalytic converter is improved by control of opening and closing of a solenoid valve which has a good responsiveness to a signal from an oxygen sensor and a good controllability of fuel supply.

A further object of this invention is to provide an internal combustion engine with a simple and inexpensive exhaust gas purifying system which improves an efficiency of purification of noxious components such as HC, CO, NOx in exhaust gas.

For achieving these objects, this invention proposes an internal combustion engine comprising a combustion chamber having an intake port and an exhaust port, a main intake passage supplying an air-fuel mixture produced by a carburetor to said intake port, an injection port opening to said combustion chamber, an auxiliary intake passage connected to said injection port and supplying air or an air-fuel mixture thereto, a fuel supplement passage for supplementally supplying fuel to said auxiliary intake passage, a solenoid valve for opening and closing at least one of said auxiliary intake passage and fuel supplement passage, an exhaust passage connected to said exhaust port, a catalytic converter disposed in said exhaust passage, an oxygen sensor disposed in said exhaust passage either upstream or downstream of said catalytic converter, and a control device responsive to a signal from said oxygen sensor to control opening and closing of said solenoid valve, an amount of air or fuel supplied to said combustion chamber through said auxiliary intake passage being changed by control of opening and closing of said solenoid valve, thereby regulating an overall air-fuel ratio of the air-fuel mixture supplied to said combustion chamber approximately to a stoichiometric air-fuel ratio.

BRIEF DESCRIPTION OF THE DRAWINGS

The invention will now be explained by way of example with reference to the accompanying drawings in which.

DESCRIPTION OF THE PREFERRED EMBODIMENTS

Figure 1:
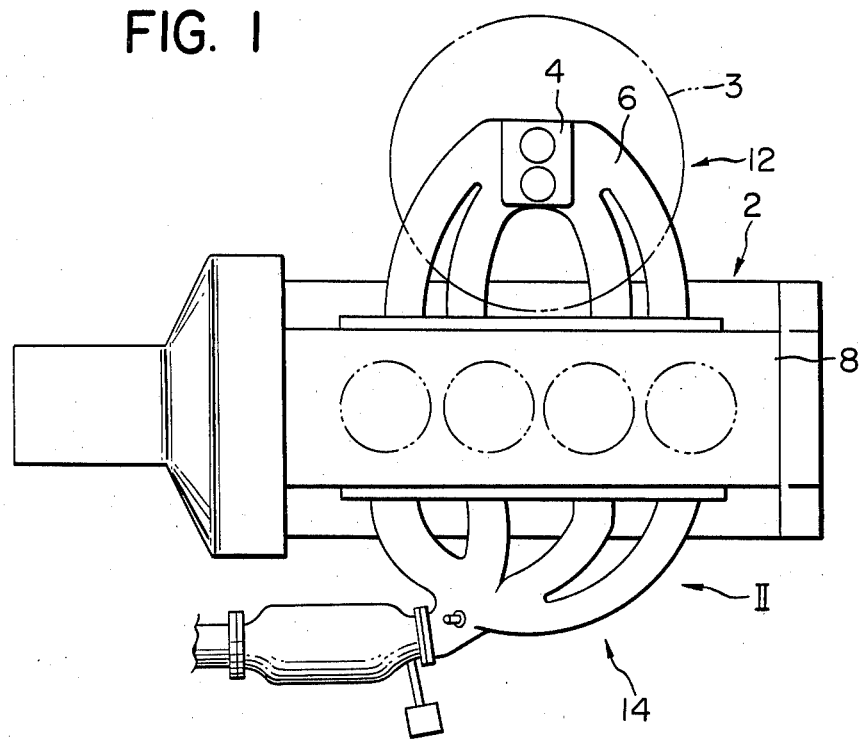
FIG. 1 is a schematic illustration of an internal combustion engine according to this invention.
Figure 2:
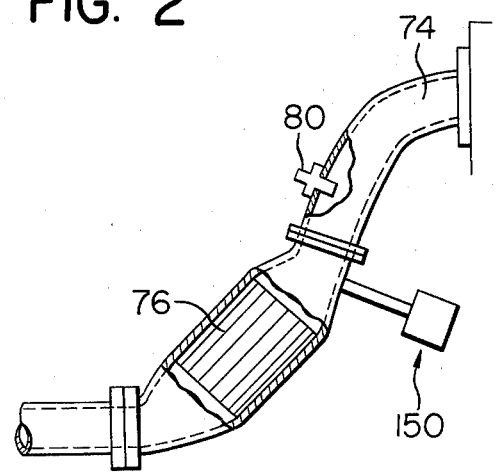
FIG. 2 is a side view seeing from an arrow II in FIG. 1, partially shown in cross-section.
Figure 3:
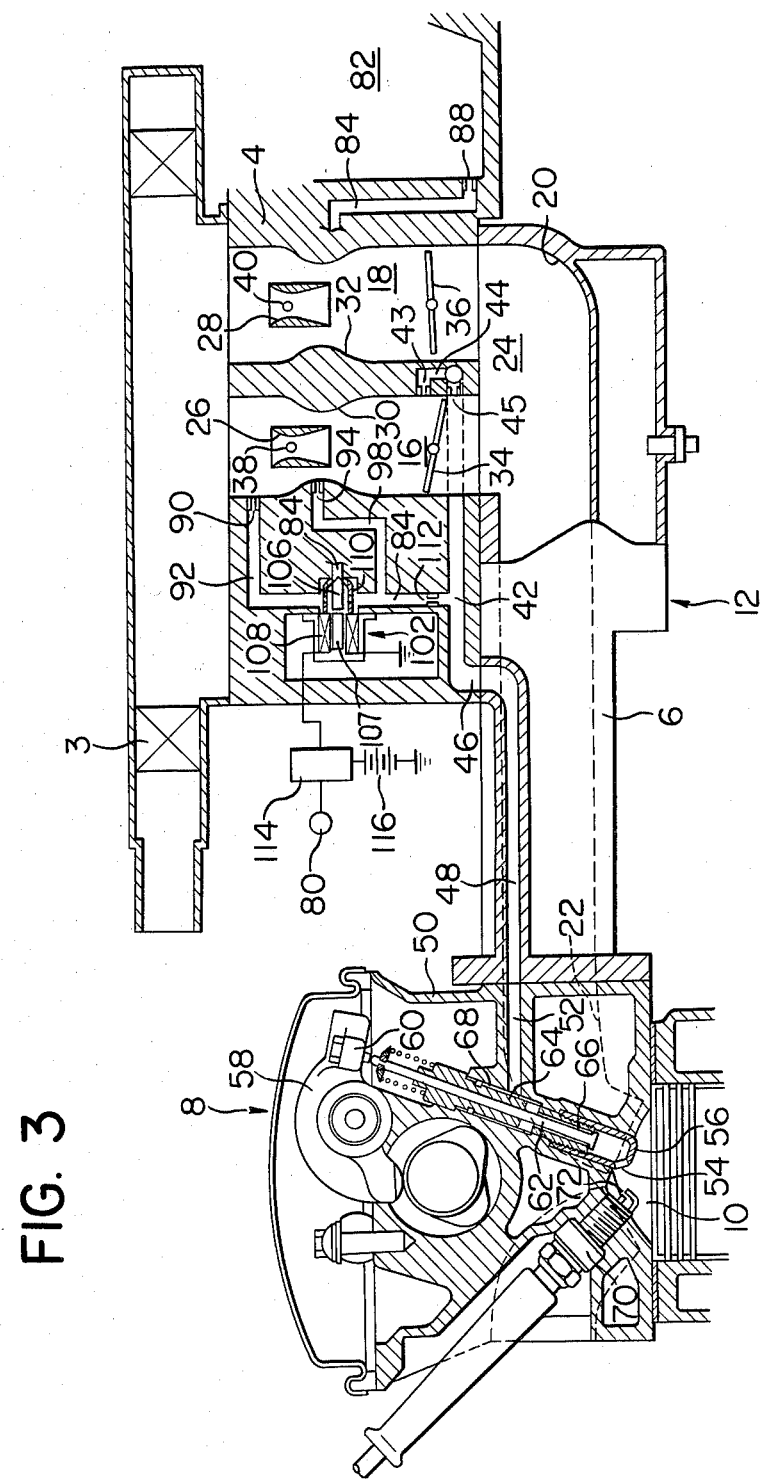
FIG. 3 is a cross-sectional view of the engine in FIG. 1.

Referring to FIGS. 1 to 3, numeral 2 designates the entirety of an internal combustion engine comprising an intake system 12, which supplies an air-fuel mixture produced by a carburetor 4 having an air cleaner 3 to a combustion chamber 10 in the engine 8 per se through an intake manifold 6, and an exhaust system 14 for discharging exhaust gas from the combustion chamber 10 to atmosphere. The carburetor 4 includes a primary mixture passage 16 and a secondary mixture passage 18 which communicate with an passage 20 in an intake manifold 6 and an intake port 22 in the engine 8. Said passages 16, 18 and 20 and port 22 define a main intake passage 24. The mixture passages 16 and 18 are provided therein with inner venturies 26 and 28, outer venturies 30 and 32 and throttle valves 34 and 36 respectively. Fuel supplied from main nozzles 38 and 40 provided in said inner venturies 26 and 28 and air passing through said primary and secondary mixture passages 16 and 18 form a mixture which is supplied from the intake port 22 to the combustion chamber 10 of the engine 8. An auxiliary intake passage 42 is formed in the carburetor 4 independently of said main intake passage 24. The upstream end 44 of the auxiliary intake passage opens to the upstream and downstream sides of the throttle valve 34 through orifices 43 and 45 when the throttle valve 34 is in an idle open position, while the downstream end 46 communicates with an injection port 54 opened to the combustion chamber 10 through an auxiliary passage 48 formed in the intake manifold 6 and an auxiliary passage 52 formed in a cylinder head 50 of the engine 8. Auxiliary intake air is inducted by vacuum produced in the combustion chamber 10 and injected thereinto during a suction stroke of the engine.

An amount of the auxiliary intake air led from the auxiliary intake passage 42 to the injection port 54 increases proportionally to increase of the vacuum produced in the combustion chamber 10. That is, the amount of the auxiliary intake air led from the auxiliary intake passage 42 to the injection port 54 increases in reverse proportion to an opening degree of the throttle valve 34. However, in this embodiment, provision of the orifice 45 prevents the supply of an excessive amount of the auxiliary intake air at the extremely small opening degree of the throttle valve 34 including the idle opening degree thereof. That is, the orifice 43 is always positioned upstream of the throttle valve 34, while the orifice 45 is positioned downstream of the throttle valve at the idle and extremely small opening degrees thereof and positioned upstream at the large opening degree. Thus, the amount of the auxiliary intake air led from the auxiliary intake passage 42 to the injection port 54 is decreased by high vacuum produced at the downstream side of the throttle valve 34 when the latter is in the idle and extremely small opening degrees.

The injection port 54 is drilled in a cylindrical member 56 press-fitted in the cylinder head 50. Opening and closing of the auxiliary intake passage communicating with the injection port 54 is controlled by an auxiliary intake valve 62 actuated by an auxiliary rocker arm 60 which is formed integrally with a rocker arm 58 for opening and closing an intake valve (not shown) for the intake port 22. The injection port 54 communicates with a clearance 66 between the auxiliary intake valve 62 and a sleeve 64 in which the auxiliary intake valve 62 is slidably mounted. The clearance 66 communicates with a clearance 68 between said sleeve 64 and the cylinder head 50, and in turn the clearance 68 communicates with the auxiliary passage 52 in the cylinder head. The injection port 54 is positioned near to a spark gap 72 of a spark plug 70, which is provided in the cylinder head 50 to dispose the spark gap in the combustion chamber 10, and directed toward the vicinity of the spark gap 72. The auxiliary intake air injected from the injection port 54 imparts a strong swirl or turbulence to the air-fuel mixture inducted into the combustion chamber 10 from the main intake passage 24 and scavenges the exhaust gas from the vicinity of the spark gap 72 of the plug 70, thereby improving ignitability of the mixture and facilitating rapid stable combustion thereof.

Figure 4:
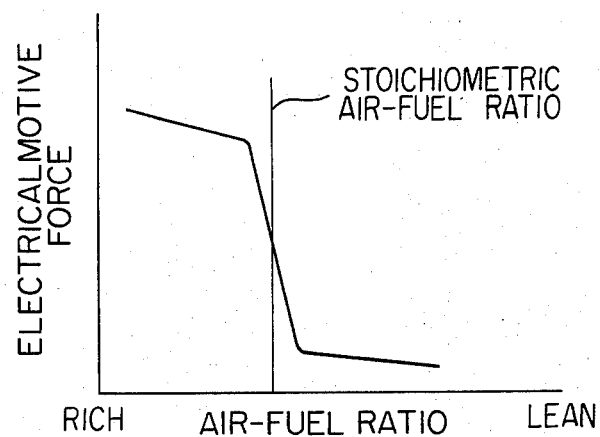
FIG. 4 is a diagram showing a characteristic of an oxygen sensor.

The exhaust system 14 includes an exhaust manifold 74 fixed to the cylinder head 50, a ternary catalytic converter 76 disposed downstream of the exhaust manifold 74 and an oxygen sensor 80 provided therein at a position upstream of the ternary catalytic converter 76. As shown in FIG. 4, said oxygen sensor 80 has a characteristic such that it generates a low electromotive force when an amount of oxygen contained in the exhaust gas is large, that is the air-fuel mixture supplied to the combustion chamber 10 is a lean mixture of a high air-fuel ratio, and generates a high electromotive force when an amount of oxygen in the exhaust gas is small, that is the mixture is a rich mixture, and causes a rapid change of said electromotive force at the stoichiometric air-fuel ratio.

A fuel supplement passage 84 leading to the auxiliary intake passage 42 is formed in the carburetor 4 and communicates with a float chamber 82 through a secondary main jet 88. The fuel supplement passage 84 is supplied with air through a first bleed air passage 92, which communicates with the primary mixture passage 16 upstream of the outer venturi 30 through a first orifice 90, and through a second bleed air passage 98 which communicates with said passage 16 through a second orifice 94 provided in the outer venturi 30. A solenoid valve 102 disposed in the fuel supplement passage 84 includes a magnetized valve body 106, a solenoid 108 for actuating the valve body 106 and an iron core 107. Since the valve body 106 is a permanently magnetized member, it is attracted toward the iron core 107 to open the fuel supplement passage 84 upon deenergization of the solenoid 108 and moved away due to repulsion of the electro-magnetic force to close the fuel supplement passage 84 upon energization of the solenoid 108. A porous cap 110 is disposed around the periphery of the valve body 106 in the fuel supplement passage 84 so that mixing of fuel and air supplied from the first bleed air passage 92 is taken place satisfactorily. Furthermore, at the downstream side of said cap 110 in the fuel supplement passage 84, air from the second bleed air passage 98 is added to said mixed fuel and air. The fuel supplement passage 84 opens to the auxiliary intake passage 42 through an orifice 112. A control device 114 for said solenoid valve 102 is connected to the solenoid 108, the oxygen sensor 80 and an electrical power source 116. The control device 114 is responsive to an output signal from the oxygen sensor 80 to increase or decrease a duty, that is, a rate of time of electric supply to the solenoid 108 within a constant time period. In this embodiment, the solenoid valve 102 is opened and closed at a frequency of about 10 Hz. When said duty is decreased, the rate of time for opening the valve body 106 is increased so that the air-fuel mixture in the auxiliary intake passage 42 becomes rich. On the contrary, when the duty is increased, the rate of time for opening the valve body 106 is decreased so that the mixture in the auxiliary intake passage 42 becomes lean. In this embodiment, the solenoid valve 102 is set to be opened and closed ten times per second, but this is set experimentally in consideration of responsiveness of opening and closing action of the solenoid valve 102 and controllability of fuel supply. According to the actual experiments, it is advantageous to set the frequency of opening and closing of the solenoid valve 102 within a range between a frequence of several Hz and a frequency of several Hz plus several Hz. The mixture in the auxiliary intake passage 42 is inducted from the injection port 54 into the combustion chamber 10 through the auxiliary intake valve 62 and mixed with the air-fuel mixture inducted from the main intake passage 24. Consequently, as the mixture in the auxiliary intake passage 42 becomes rich, an overall density of the mixture in the combustion chamber 10 becomes rich. On the contrary, as the mixture in the auxiliary intake passage 42 becomes lean, the overall density of the mixture in the combustion chamber 10 becomes lean.

Figure 5:
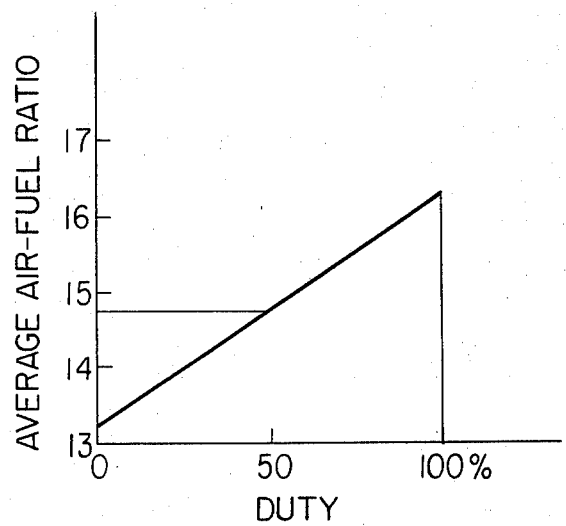
FIG. 5 is a diagram showing a relationship between an average air-fuel ratio of an entire air-fuel mixture inducted into a combustion chamber and a duty of a solenoid valve.

FIG. 5 shows an example of changes of the average air-fuel ratio of the entire mixture supplied to the combustion chamber 10 with respect to changes of the duty.

The internal combustion engine as described above operates as follows.

Assuming that the air-fuel ratio of the mixture produced by said carburetor 4 is set a value of for example 16–17 which is higher than the stoichiometric air-fuel ratio. If the oxygen sensor 80 generates the output signal of a low electromotive force when the air-fuel ratio of the mixture in the combustion chamber 10 is high, that is, the mixture is lean, the control device 114 decreases the duty of said solenoid 108 to make the mixture in the combustion chamber 10 richer. If the oxygen sensor 80 generates the output signal of a high electromotive force when the air-fuel ratio of the mixture in the combustion chamber 10 is low, that is, the mixture is rich, the control device 114 increases the duty of the solenoid 108 to make the mixture in the combustion chamber 10 leaner.

It will now be explained about bleeding of air and fuel supplied to the auxiliary intake passage 42.

When the auxiliary intake valve 62 is opened, vacuum, which is high during low-speed, low-load driving range of the engine and is low during high-speed, high-load driving, communicates with the auxiliary intake passage 42 to induct an amount of fuel proportionally to a level of said vacuum from the fuel supplement passage 84. However, the fuel supplement passage 84 is communicated with atmosphere through the first bleed air passage 92 and supplied with bleed air. The fuel supplement passage 84 is also supplied with bleed air through the second bleed air passage 98 opened to the outer venturi 30. Consequently, during the low-speed, low-load driving range of the engine in which the vacuum in the combustion chamber 10 is high, fuel is inducted by the vacuum communicating from the auxiliary intake passage 42 to the fuel supplement passage 84, but the mixture produced in the auxiliary intake passage 42 is relatively lean but richer than the stoichiometric mixture since air is supplied to the fuel supplement passage 84 through the second bleed air passage 98 opening to the outer venturi 30. During the high-speed, high-load driving range, high vacuum proportioned to a velocity of flow of the intake air at the outer venturi 30 communicates with the second bleed air passage 98 to reduce the amount of air supplied to the fuel supplement passage 84, so that the mixture produced in the auxiliary intake passage 42 becomes rich sufficiently.

Thus, during the low-speed, low-load driving range of the engine, the mixture in the combustion chamber 10 is formed by a relatively small amount (about 70% of the overall amount of the mixture supplied to the combustion chamber 10) of the lean mixture supplied through the main intake passage 24 and a relatively large amount (about 30% of the overall amount of the mixture supplied to the combustion chamber 10) of the rich mixture supplied through the auxiliary intake passage 42. During the high-speed, high-load driving range, the mixture in the combustion chamber 10 is formed by a relatively large amount (about 90% of said overall amount of the mixture) of the lean mixture supplied through the main intake passage 24 and a relatively small amount (about 10% of said overall amount of the mixture) of the rich mixture supplied through the main intake passage 24.

As a result, the duty of the solenoid 108 is varied in response to the output signal from the oxygen sensor 80 over the entire driving range of the engine so that the average air-fuel ratio of the entire mixture supplied to the combustion chamber 10 is controlled approximately to the stoichiometric air-fuel ratio, thereby improving the efficiency of purification of the noxious components such as HC, CO, NOx within the ternary catalytic converter 76.

According to this invention, the internal combustion engine is arranged such that the combustion chamber 10 is supplied with the mixture through the main intake passage 24 and with the rich mixture injected from the injection port 54 through the auxiliary intake passage 42 provided independently of said main intake passage 24, and that the valve body 106 disposed in the fuel supplement passage 84 for supplementally supplying fuel to the auxiliary intake passage 42 is duty-controlled in response to the output signal from the oxygen sensor 80 disposed in the exhaust system 14 to control the mixture in the combustion chamber 10 approximately to the stoichiometric air-fuel ratio. This arrangement can provide a simple and inexpensive exhaust gas purifying system.

In the embodiment described above, as the oxygen sensor 80 is activated at a temperature of about 300° C., it cannot generate the output signal proportioned to the density of the mixture in the combustion chamber 10 when the temperature is below said value. Therefore, the control device 114 may be memorized of some constant value of the duty, and the valve body 106 is opened and closed in response to the signal corresponding to said constant value so as to control the mixture in the combustion chamber approximately to the stoichiometric air-fuel ratio until the oxygen sensor is activated during a driving range of the engine in its cold condition. In such a condition, a choke valve provided in the carburetor is generally operated, so that the mixture becomes rich and the density of HC, CO in the exhaust gas becomes high. In order to diminish HC, CO, a secondary air supplying means 150 is provided upstream of the ternary catalytic converter 76 and supplies secondary air thereto to oxidize HC, CO in the exhaust gas until the oxygen sensor 80 becomes activative after the engine is started in its cold condition.

After activation of the oxygen sensor 80, HC, CO, NOx in the exhaust gas are purified simultaneously within the ternary catalytic converter 76. In order to improve further the efficiency of purification of HC, CO, an oxidizing catalytic converter may be provided downstream of the ternary catalytic converter 76, and the secondary air supplying means 150 may be disposed between the ternary catalytic converter and the oxidizing catalytic converter to supply secondary air to improve the oxidation.

What is claimed is:

1. An internal combustion engine comprising a combustion chamber having an intake port and an exhaust port, a main intake passage supplying an air-fuel mixture produced by a carburetor to said intake port, an injection port opening to said combustion chamber, an auxiliary intake passage connected to said injection port and supplying air or an air-fuel mixture thereto, a fuel supplement passage for supplementally supplying fuel to said auxiliary intake passage, a solenoid valve for opening and closing at least one of said auxiliary intake passage and fuel supplement passage, an exhaust passage connected to said port, a catalytic converter disposed in said exhaust passage, an oxygen sensor disposed in said exhaust passage either upstream or downstream of said catalytic converter, and a control device responsive to a signal from said oxygen sensor to control opening and closing of said solenoid valve, an amount of air or fuel supplied to said combustion chamber through said auxiliary intake passage being changed by control of opening and closing of said solenoid valve, thereby regulating an overall air-fuel ratio of the air-fuel mixture supplied to said combustion chamber approximately to a stoichiometric air-fuel ratio.

2. An internal combustion engine according to claim 1, wherein said solenoid valve opens and closes said fuel supplement passage.

3. An internal combustion engine according to claim 1, wherein said oxygen sensor is disposed upstream of said catalytic converter.

4. An internal combustion engine according to claim 1, wherein said catalytic converter is a ternary catalytic converter for purifying noxious components such as HC, CO, NOx in the exhaust gas.

5. An internal combustion engine according to claim 1, wherein said injection port is positioned near to a spark gap of a spark plug and directed toward the vicinity of said gap.

6. An internal combustion engine according to claim 1, wherein said control device is memorized of a predetermined duty value, said device controlling opening and closing of said solenoid valve in response to a signal corresponding to said predetermined duty value, irrespective of the signal from said oxygen sensor, so as to control the overall air-fuel ratio of the mixture supplied to said combustion chamber approximately to the stoichiometric air-fuel ratio during a driving range of the engine in a cold condition in which said oxygen sensor is inactive.

* * * * *